United States Patent [19]
Pincent et al.

[11] Patent Number: 4,890,488
[45] Date of Patent: Jan. 2, 1990

[54] ULTRASONIC ANEMOMETER

[75] Inventors: Bernard Pincent, Chevreuse; Paul Journe; Gérard Brugnot, both of Grenoble, all of France

[73] Assignee: Simecsol, Le Plessis Robinson, France

[21] Appl. No.: 318,691

[22] Filed: Mar. 3, 1989

[30] Foreign Application Priority Data

Mar. 3, 1988 [FR] France ................ 88 02722

[51] Int. Cl.$^4$ ............................................ G01W 1/04
[52] U.S. Cl. .................................................... 73/189
[58] Field of Search ................ 73/189, 861.27, 861.06

[56] References Cited

U.S. PATENT DOCUMENTS

| | | |
|---|---|---|
| 3,435,677 | 4/1969 | Gardner . |
| 3,633,415 | 1/1972 | Luce . |
| 4,174,630 | 11/1979 | Nicoli ............................ 73/189 X |
| 4,262,545 | 4/1981 | Lamarche et al. ............ 73/189 X |
| 4,576,047 | 3/1986 | Lauer et al. ................... 73/597 |
| 4,787,252 | 11/1988 | Jacobson et al. ............. 73/861.28 |

FOREIGN PATENT DOCUMENTS 2408145  6/1979  France .

OTHER PUBLICATIONS

D. J. Cathignol, "Signal-To-Clutter Ratio in Pseudo Random Doppler Flowmeter" *Ultrasonic Imaging* 8, pp. 272-284, Oct. 1986.

Primary Examiner—Charles A. Ruehl
Attorney, Agent, or Firm—Mason, Fenwick & Lawrence

[57]    ABSTRACT

In the ultrasonic anemometer, ultrasonic emitting probes (E1-E4) and receiving probes (R1-R4) are mounted to define at least three different paths for propagation of ultrasonic signals in the air, and means (20) are provided for measuring the ultrasonic signal propagation time along the different paths and for calculating the direction and the speed of the wind based upon these measurements. The emitting and receiving probes are low frequency probes, the emitting probes producing a predetermined wave train type signal of frequency between 10 and 200 kHz; and the measuring and calculating means include means for measuring propagation time by correlation between the emitted and received signals.

6 Claims, 3 Drawing Sheets

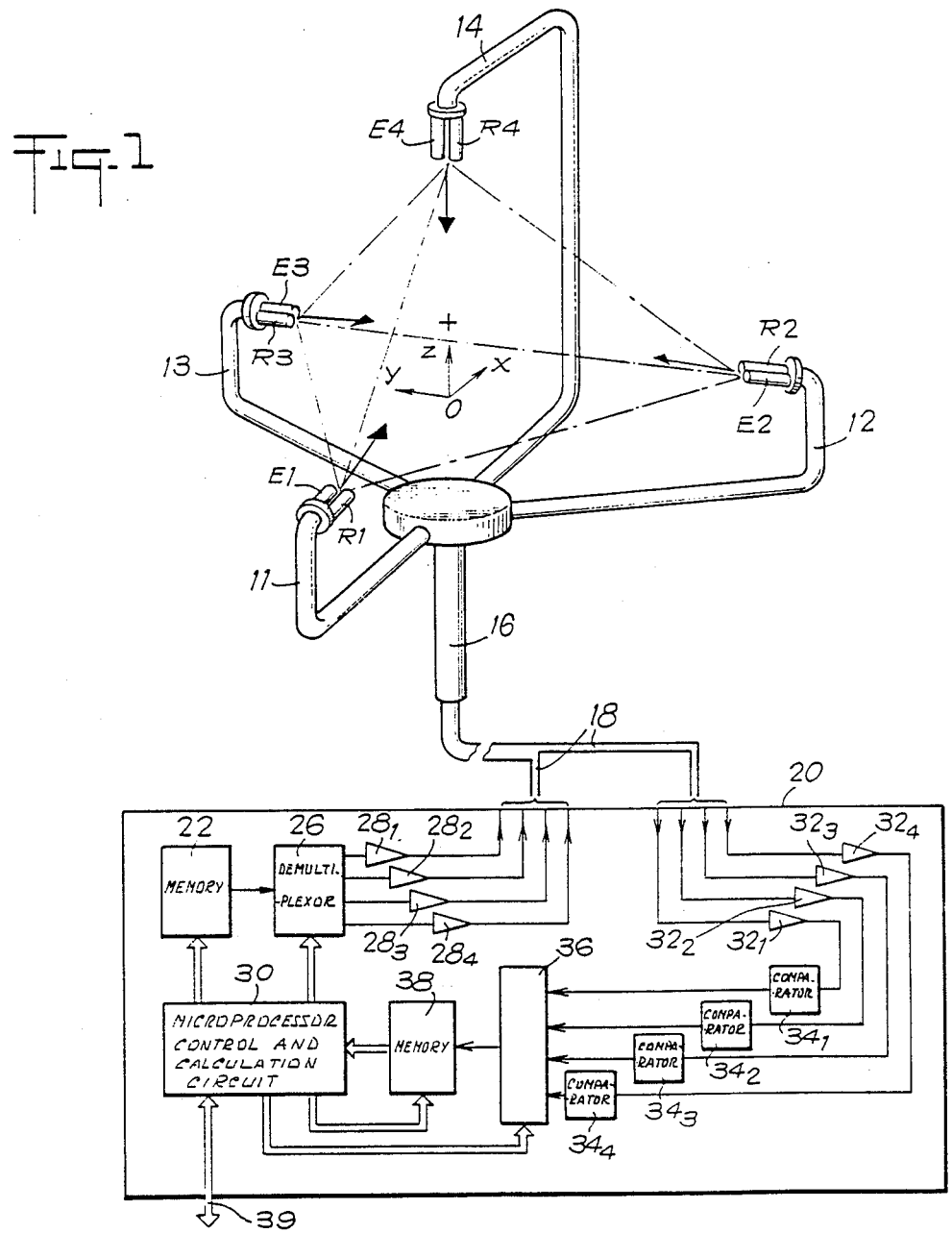

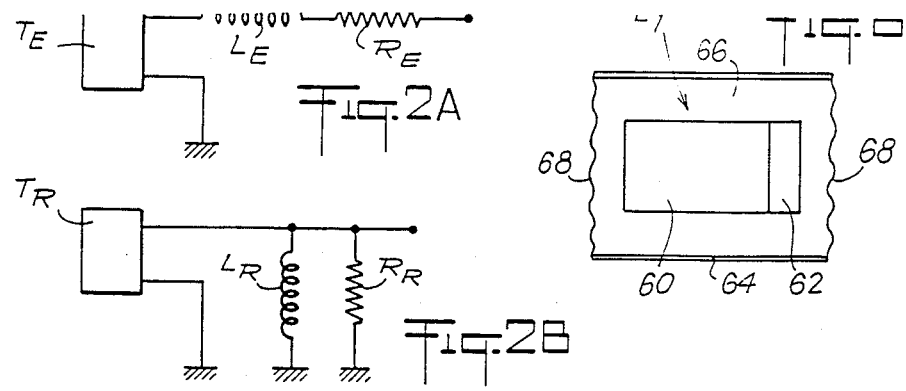
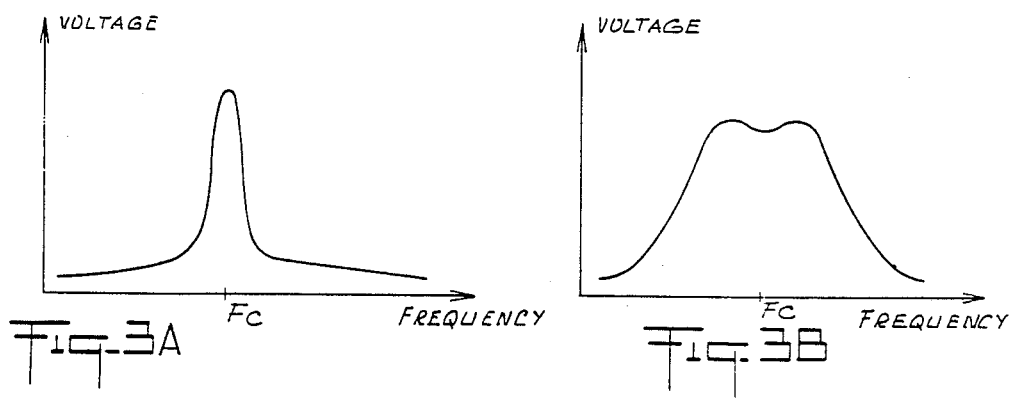
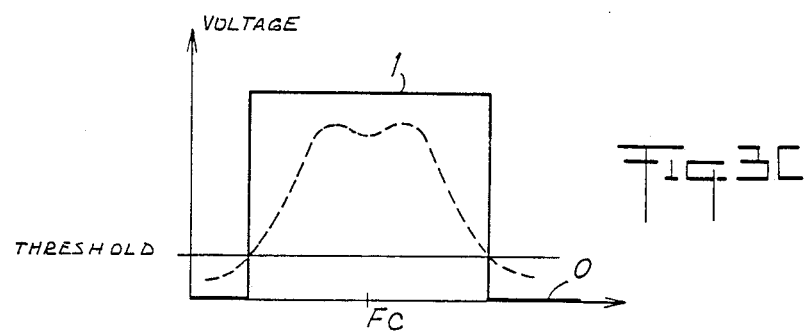
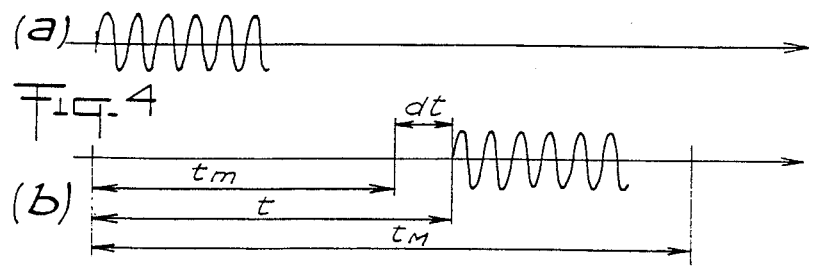

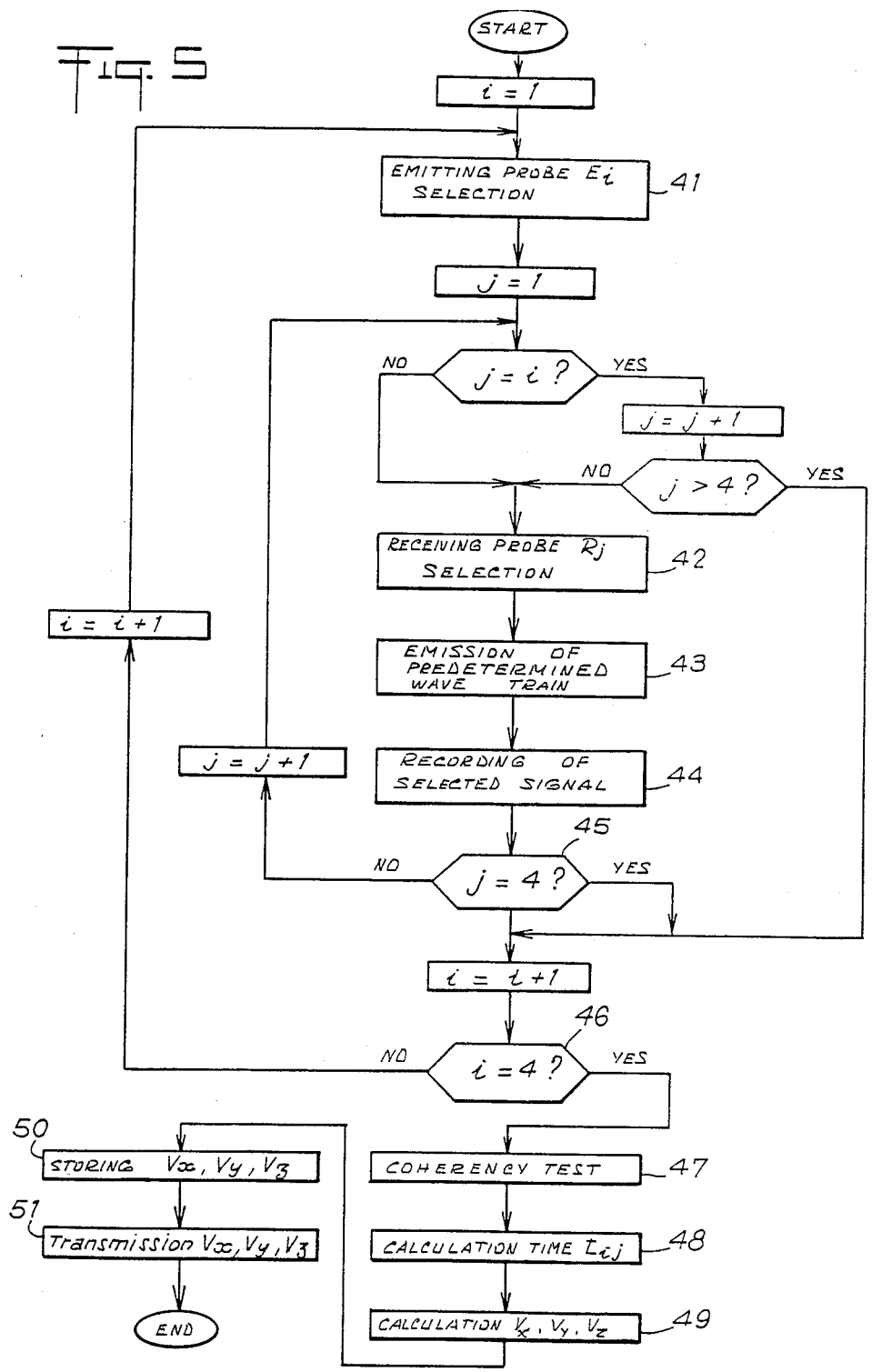

4,890,488

ULTRASONIC ANEMOMETER

BACKGROUND OF THE INVENTION

1. Field of the Invention

The present invention relates to an anemometer of the type comprising a set of ultrasonic emitting and receiving probes arranged such as to define at least three different air paths of propagation of ultrasonic signals, and a device for measuring the ultrasonic signal propagation time along the different paths and for calculating the direction and the speed of the wind based upon the measured propagation times.

2. Description of the Prior Art

Numerous types of anemometers exist, but none provides measurement of wind speed with the desired degree of precision in difficult conditions, notably in freezing or snowy conditions, and with sufficient autonomy.

Moreover, frost significantly perturbs rotating anemometers by modifying the coefficient of friction in mechanical trains. Frost can indeed be eliminated with heating, but this entails unacceptable levels of energy consumption. Furthermore, rotating anemometers may give readings with a high degree of error in extreme conditions (eg. very high wind speed).

Anemometers with no moving parts do not have the drawbacks of rotating anemometers, but their operation is affected by the formation of frost or the settling of snow on their sensitive parts such as the Pitot tube, etc. This sensitivity to frost and snow is also a problem in known ultrasonic anemometers.

The latter have additional drawbacks. In certain cases, the propagation time between the emitting probe and the receiving probe is determined by measuring the time interval between the signal emission and the signal reception, detected by the crossing of a receiving probe output signal threshold. This method proves to be sensitive to parasitic signals and necessitates the emission of relatively high energy signals, reducing the autonomy of the apparatus.

In other cases, the measurement is based on a phase shift between the emitted signal and the received signal. Due to the frequency of the ultrasonic signal and to the distance between the emitting and receiving probes, the phase shift occurs over several periods of the ultrasonic signal. Errors can be thus introduced by loss of the zero phase shift reference.

SUMMARY OF THE INVENTION

The object of the present invention is to provide an ultrasonic anemometer, the operation of which is unaffected by frost or snow, which does not require a high energy consumption and which can hence offer a high degree of autonomy, and which can provide reliable measurement of ultrasonic propagation time between the emitting and receiving probes.

The above object is realized in an ultrasonic anemometer of the type set forth in the Field of the Invention in which, according to the invention:

the emitting and receiving probes are low frequency probes, each emitting probe emits an ultrasonic signal in the form of a predetermined wave train with an ultrasonic frequency of between 10 and 200 kHz, and the measuring and calculating device includes means for measuring propagation time by correlation between the signal emitted by one emitting probe and the signal received by at least one receiving probe.

The use of low frequencies, contrary to general practice in known ultrasonic anemometers, allows certain problems to be avoided, such as the reflection and the diffraction of ultrasonic waves due to obstacles in their path (snow, sand, sea spray, etc.). In addition, sensitivity to snow or frost is lessened by the fact that the waves can more easily traverse parasite materials. It is then possible to protect each probe with a vibrating material which precludes the formation of frost, without perturbing markedly the passage of ultrasonic vibrations.

The measurement of propagation time by correlation permits the drawbacks discussed above, related to reception detection by the crossing of a threshold or by phase shift measurement, to be obviated. In order to obtain the most meaningful correlation possible, the emitting and receiving probes are preferably of wide or widened pass-band.

The correlation may be carried out on only two levels; that is, after digitizing the emitted and received signals on only one bit.

The set of emitting and receiving probes can be arranged so as to form a redundant system; that is, a system allowing a greater number of propagation time measurements than are needed to determine the wind velocity (direction and magnitude). This minimum number is four when the speed of sound in the ambient air is unknown, and three when the speed of sound is known, by, for instance, measurement of the ambient temperature. The redundance allows the continuation of measurement in spite of inoperability of one probe, the establishment of a confidence interval for each measurement, and the determination of possible systematic errors.

The emitting and receiving probes are preferably multidirectional, in order to form a unit in which each emitting probe puts out an ultrasonic signal which can be received by several receiving probes.

In such a way, a redundant system can be built with a minimum number of probes.

These and other objects and advantages of the anemometer according to the invention will be more thoroughly established in the following description in which reference is made to the accompanying drawings.

BRIEF DESCRIPTION OF THE DRAWINGS

FIG. 1 is a diagrammatical/schematical view of one embodiment of an ultrasonic anemometer according to the invention;

FIGS. 2A and 2B are detailed schematical views of the probe band-pass widening arrangement for the device of FIG. 1;

FIGS. 3A, 3B and 3C are curves showing the widening of the band-pass obtained with the assembly of FIG. 2;

FIG. 4 comprises diagrams representing a signal emitted by one probe and the same signal received by another probe, in order to demonstrate the principle of propagation time measurement by correlation;

FIG. 5 is a flow chart showing the successive operations carried out during one measurement cycle; and, FIG. 6 is a detailed view of an ultrasonic probe equipped with a protective device of vibrating fabric.

DESCRIPTION OF THE PREFERRED EMBODIMENTS

An ultrasonic anemometer comprises a set of ultrasonic emitting and receiving probes which define at least three different, non-coplanar paths for ultrasonic signals, between an emitting probe and a receiving probe. Assuming the speed of sound in the ambient air is known, measurement of the propagation time of the ultrasonic signals along the three paths permits the calculation of the wind speed and direction, for example, by way of analysis of the components of three mutually orthogonal velocity vectors. When the speed of sound is unknown, measurement of propagation time along a different, fourth path is necessary in order to arrive at a calculated solution.

A preferred embodiment of an anemometer according to the invention will now be described with reference to FIG. 1.

The ultrasonic anemometer shown in FIG. 1 comprises four ultrasonic emitting probes E1, E2, E3, E4 and four ultrasonic receiving probes R1, R2, R3, R4. The probes are arranged in pairs, each pair including an emitting probe and a receiving probe placed side by side. In the embodiment shown, the four pairs of probes are located at the apices of a regular tetrahedron (of which the edges are represented by chain lines).

The probes are of the multidirectional type and are orientated in such a way that the emission or reception cone of each pair of probes encompasses the probes of the three remaining pairs. In the illustrated embodiment, the axis of the emission or reception cone of each probe is directed toward the center of the tetrahedron on the apices of which the probes are located. Thus, the signal emitted by each emitting probe is received by three different receiving probes. The set of probes defines, then, 12 different paths for ultrasonic signals which, as indicated above, constitutes a redundant system.

It will be appreciated that any other arrangement of the emitting and receiving probes can be adopted as long as it affords the definition of at least three different, non-coplanar paths, if the speed of sound in the ambient air is known, and four different, non-coplanar paths if the speed of sound in the ambient air is unknown.

Furthermore, in place of separate emitting and receiving probes, probes operative as emitting probes and receiving probes may be used, in conjunction with adequate means for switching their mode of operation.

In the embodiment shown in FIG. 1, the probes are supported on a structure comprising support arms 11, 12, 13, 14, arranged in such a way as not to interfere with the ultrasonic signal paths. The arms connect the probes to a base 16.

The arms 11 to 14 and the base 16 are tubular and serve as conduits for electrical conductors 18 connecting each probe to a circuit 20 for energizing the emitting probes and for treatment of the electrical signals produced by the receiving probes.

In accordance with a particular feature of the invention, each ultrasonic signal propagation time, between an emitting probe and a receiving probe is measured by correlation between the signal put out by the emitting probe and the signal received by the receiving probe.

In order to obtain the most meaningful correlation possible, the ultrasonic probes used are preferably of wide or widened band-pass. The widening of the band-pass of a probe, for example of E1 is accomplished by the adaptation of the impedance by means of an R-L-C type circuit, the components of which are mounted in the same housing as that containing the piezoelectric transducer for the probe. FIGS. 2A and 2B show such a circuit impedance adaptation for an emitting probe transducer $T_E$ and a receiving probe transducer $T_R$. For emission, the impedance adaptation circuit includes an inductor $L_E$ in series with a resistor $R_E$ on a first terminal of the transducer $T_E$ (input terminal), the other terminal of the transducer being connected to ground. For reception, the impedance adaptation circuit includes an inductor $L_R$ and a resistor $R_R$ in parallel between a first terminal of the transducer $T_R$ (output terminal) and ground, the other terminal of the transducer being connected to ground. The capacitive components of the impedance adaptation circuits result from the parasitic capacity of the transducers.

In the above cited case of a transducer able to operate in emitting and in receiving, a switching circuit controlled by circuit 20 is connected to the first terminal of the transducer in order to connect the latter either by an input terminal through an impedance adaptation circuit such as in FIG. 2A, or to an output terminal through an impedance adaptation circuit such as in FIG. 2B.

FIGS. 3A and 3B show the voltage-frequency transfer characteristics for a probe, before and after impedance adaptation. FIG. 3A shows that before impedance adaptation, the probe has a relatively narrow band-pass, centered on the probe characteristic frequency $F_C$. The effects of band-pass widening by impedance adaptation are shown in FIG. 3B.

This widening effect can be reinforced upon reception by encoding the signal received at two levels, or by all or nothing encoding (1 or 0), by choosing, for a given emission strength, a voltage threshold corresponding to as extreme a frequency as possible, on either end of the band-pass. The dashed line of FIG. 3C shows the band-pass after adaptation but before comparison with the set voltage threshold (same curve as is shown in FIG. 3B), whereas the solid line of FIG. 3C shows the band-pass after comparison with the set threshold.

According to another feature of the invention, the ultrasonic probes used are low frequency probes; that is, having a characteristic frequency of between 10 and 200 kHz, and preferably between 15 and 40 kHz.

The correlation is carried out between the emitted signal and the received signal both encoded on a single bit (that is, 1 or 0).

In the embodiment shown, the emitted signal is the same for all the emitting probes and takes the form of a predetermined wave train (line (a) of FIG. 4). The word representing the bi-level encoded, emitted signal is stored in the memory 22 which forms a part of circuit 20 (see FIG. 1). The successive bits forming the word stored in memory 22 are read sequentially by memory address command signals provided by a microprocessor control and calculation circuit 30. The memory 22 may be a read only memory, or ROM, in which the word representing the emitted signal is continuously recorded, or a random access memory, or RAM, loaded by circuit 30. The read rate and the internal sequence coding are chosen so as to form an analog frequency modulated signal, with a midband frequency preferably between 20 and 30 kHz and with a band width of between 5 and 10 kHz. This signal is applied to the input of a demultiplexor circuit 26 having four outputs connected to the emitting probes E1 to E4 through respective amplifiers $28_1$ to $28_4$. The demultiplexor circuit command signals are provided by circuit 30 so as to energize the selected emitting probe.

In response to the predetermined ultrasonic wave train emitted by the emitting probe, the receiving probes (all but the one juxtaposed to the emitting probe)

receive the wave train with delays corresponding to the ultrasonic wave propagation time. Line (b) of FIG. 4 shows the wave train received by a probe after a delay t. The determination of the propagation time is accomplished by finding the value of the shift required between the emitted and received signals which gives the best correlation between those signals in superposition.

The electrical signals produced by the probes R1 to R4 are amplified by respective amplifiers $31_1$ to $32_4$.

In the embodiment described, of encoding on only two levels, each converter circuit $34_1$ to $34_4$ constitutes a comparator of which the threshold is chosen as indicated above in reference to FIG. 3C. The available bits at the output of the comparator circuits $34_1$ to $34_4$ are applied to the respective inputs of the multiplexor 36 of which the output is connected to a random access, or RAM, memory 38. The recording in memory 38 is carried out at the address command signal rate produced by circuit 30 and applied to memory 38, the write rate in memory 38 being identical to the read rate of memory 22.

In the embodiment described, a basic measurement cycle includes recording of the 12 words corresponding to the signals produced by the receiving probes for the 12 ultrasonic signal paths, in distinct zones of the memory 36. Each measurement cycle includes four sub-cycles effected by successive selection of the four emitting probes. Each sub-cycle includes a sequence of three successive emissions of the coded emission signal. The multiplexor 36 is controlled by signals from circuit 30 in such a way as to enable the successive recording of the words corresponding to the signals produced by the three receiving probes, receiving the signal emitted by the selected emitting probe.

The recording in memory 38 of the signal produced by the receiving probe, and then encoded, is carried out during a period beginning at a time $t_m$ and ending at a time $t_M$ after the beginning of the emission of the wave train by the emitting probe. The times $t_m$ and $t_M$ are chosen such that the measured propagation time always falls within the interval between $t_m$ and $t_M$.

The correlation determination carried out with respect to the digitized emitted and received signals amounts to finding the shift dt between the recorded emitted and received signals which results in the best correlation between the two signals in superposition. The propagation time sought is, then, $t_m + dt$ (see FIG. 4).

In practice, assuming the digitized emitted signal is a word with n bits and the digitized received signal is a word with N bits (N being greater than n), the correlation determination consists in:

effecting a logical "and" operation between each bit of the emitted word and the corresponding bit of the first n bits of the received word, for example:
Emitted word: 11000111
Received word: 00000110001111000
Result: 00000110;
counting the number of "1"s in the result;
shifting the received word one bit to the left; and
repeating the same operation until the $(N-n)_{th}$ shift.

The temporal shift dt sought is, then, that for which the number of "1"s in the result is a maximum.

The correlation determination is carried out by program using the microprocessor circuit 30.

The 12 digitized words recorded in the memory 38 during one basic measurement cycle afford the determination of twelve propagation times corresponding to paths, running in two opposing directions, along the six edges of the tetrahedron at the apices of which the probes are located.

The resulting set of redundant measurements can be used in a number of ways.

Firstly, a coherency test can be carried out on the digitized received signals in order to eliminate those in which the number of "1"s does not fall within a range predetermined as a function of the corresponding digitized emitted signal.

Among the received signals remaining after the coherency test, a limited number of them may be retained in order to reduce to the strict minimum necessary, the number of propagation time values, along the various non-coplanar paths, permitting the calculation of the speed and the direction of the wind. This minimum number is three if the speed of sound in the ambient air is known, for instance from temperature measurements taken by suitable means which may be included in the device. This minimum number is four if the speed of sound is considered as an additional variable.

As an example, $V_x$, $V_y$ and $V_z$, vector components of the wind velocity may be found, orientated along the mutually orthogonal axes $O_x$, $O_y$, $O_z$ of a reference coordinate system as follows (FIG. 1):

the center O is located in the center of the triangle formed by the probe pairs E1-R1, E2-R2, E3-R3, through which passes the vertical axis on which E4-R4 is located;

the axis $O_x$ passes through the apex at which E1-R1 is located;

the axis $O_y$ is parallel to the edge joining the apices at which are located E2-R2 and E3-R3; and the axis $O_z$ passes through the apex at which E4-R4 is located.

If $t_{ij}$ represents the propagation time along the path joining the emitting probe $E_i$ and the receiving probe $R_j$ (i and j varying between 1 and 4 and i not equal to j), and $V_{ij}$ is the vector component (magnitude and direction) of the wind velocity along the axis parallel to that path and orientated in the direction from the emitting probe to the receiving probe, one obtains:

$$t_{ij} = \frac{d}{V_{ij} + c}, \text{ or } V_{ij} = \frac{d}{t_{ij}} - c,$$

where d is the length of the propagation path, that is, the length of the edges of the tetrahedron, and c is the speed of sound.

The above system of equations, by letting $V_{ij}$ take on different values, permits the components $V_x$, $V_y$ and $V_z$ to be calculated by taking three equations (if c is known) or four equations (if c is unknown) among those in which the time corresponds to received signals having satisfied the coherency test.

The redundance may also be advantageously used in carrying out a calculation utilizing an appropriate mathematical algorithm for redundance problems, affording the evaluation of the wind velocity component vectors by fixing suitable confidence intervals.

Such mathematical algorithms are known per se. As an example, one might refer to the method for the resolution of negative sequence systems described by Tarantola and Valette in the Review of Geophysics and Space Physics, volume 20, No. 2, pages 219–232, May 1982.

It should be noted that the system redundancy also permits the detection of a possible systematic error.

Such an error may be considered as an additional variable, which leads to a new redundant system of one lesser degree of redundance than in the previous case.

FIG. 5 is a flow chart summarizing the various principal steps of the process carried out under the control of the microprocessor circuit 30. These steps are:

selection of an emitting probe $E_i$ (step 41), by a command from the demultiplexor 26, starting with i=1, until i=4;

selection of a signal produced by a receiving probe $R_j$ (step 42), by a command from the multiplexer 36, letting the value of j vary from 1 to 4, but with j not equal to i;

emission of a predetermined wave train (step 43), by a command to read the word stored in the memory 22;

recording in a first zone of memory 38, the selected signal, digitized between the times $t_m$ and $t_M$ in accordance with the emission (step 44);

selection of the signal produced by a second receiving probe (j=j+1 and return to step 42), followed by a new emission of the predetermined wave train and by recording of the new signal in a second zone of memory 38;

selection of the signal produced by a third receiving probe (j=j+1 and return to step 42), followed by a new emission of the predetermined wave train and by recording of the new signal in a third zone of memory 38;

test j=4 (step 45) and return to step 41 for selection of a second emitting probe (i=i+1) and repetition of the operations above, followed in the same way by the selection of a third and a fourth emitting probe;

when all of the emitting probes have been selected (test i=4, step 46), execution of the coherency test on the recorded, digitized signals (step 47) by verification that the number of "1"s in the digitized words representing the signals falls within a predetermined range;

calculation of the propagation times $t_{ij}$ by execution of a correlation program stored in the microprocessor circuit 30 ROM memory (step 48);

calculation of vector components $V_x$, $V_y$ and $V_z$ by execution of a calculation program stored in the microprocessor circuit 30 ROM memory (step 49);

storing of calculated numerical values of the components $V_x$, $V_y$ and $V_z$ in the RAM memory of the microprocessor circuit 30 (step 50); and transmission of calculated values of $V_x$, $V_y$ and $V_z$ to a control center (step 51).

If necessary, the step 49 consisting in the calculation of the components $V_x$, $V_y$ and $V_z$, may include a preliminary step in which a temperature reading would be obtained from a suitable device mounted on the apparatus, followed by a step in which the speed of sound corresponding to that temperature would be read from a ROM memory. The calculation of the components $V_x$, $V_y$ and $V_z$ is carried out either by selection of the minimum number of propagation times necessary for the resolution of the system of equations, or by application of a redundant system algorithm, such as the method of Tarantola and Valette.

The transmission of the calculated numerical values of the components $V_x$, $V_y$ $V_z$ may be effected along a line 39 (FIG. 1) connecting the circuit 20 to a control center or to an emitter capable of transmitting these values to a remote control center.

The electrical power for the components of circuit 20 is supplied by an autonomous source such as a battery (not shown).

As has been indicated, the ultrasonic anemometer according to the invention is particularly useful in that it may be utilized in harsh environments. Its near insensitivity to frost and snow, together with its considerable autonomy make it readily useful in mountainous regions.

The insensitivity to frost may be reinforced by protecting each probe with a vibrating fabric as shown in FIG. 6.

In that Figure, the probe, $E_1$ for example, with its cylindrical casing 60 provided at one end with an ultrasonic transducer 62 (such as a piezoelectric crystal type transducer) and containing the impedance adaptation components, is housed coaxially within a tubular support 64 to which it is connected by radial arms (not shown). The annular space 66 between casing 60 and the support 64 allows for air circulation.

The ends of the support 64, which extend beyond the ends of the probe, are closed with fabric 68. This fabric is impermeable to frost but does not preclude the passage of ultrasonic waves (particularly low frequency ultrasonic waves). As FIG. 6 shows, the fabric is formed in such a way as to be able to vibrate. The vibrations, which require no other energy source than the wind in order to be maintained, inhibit the formation of frost. The fabric may be identical to that used to protect radar devices, having a very low frost adherence.

As shown in FIG. 6, the fabric 68 is fixed to the periphery of either end of the tubular support 64 and takes on the form of a disc. Alternatively, other forms may be given to the fabric by mounting it on appropriate armatures.

In the described embodiment, measurements are obtained during a basic measurement cycle by successive selection of the four emitting probes and, for each emitting probe selected, successively selecting the signals produced by the three receiving probes which capture the signal put out by the emitting probe.

Alternatively, the successive multiplexing of emissions and receptions could be replaced by a simultaneous execution of emission and reception by encoding the emitted signals differently according to the different emitting probes, whereby the signals originating in the various emitting probes can be separated upon reception. This separation is realized by correlating the received signal with each emitted signal. It is, in this case, imperative that the emitted signals be selected in such a way that their intercorrelation shows no peak (white intercorrelation).

What is claimed is:

1. An ultrasonic anemometer comprising a plurality of ultrasonic signal emitting probes and a plurality of ultrasonic signal receiving probes mounted in such a way as to define at least three paths for the propagation of ultrasonic signals through the air, and means for measuring the time of propagation of ultrasonic signals along the different paths and for calculating the speed and the direction of the wind based upon the propagation times measured, wherein the emitting and receiving probes are low frequency probes, each emitting probe capable of producing an ultrasonic signal in the form of a predetermined wave train at an ultrasonic frequency between 10 and 200 kHz, and wherein the means for measuring and calculating comprises means for measuring the propagation time by correlation of a signal produced by an emitting probe and the signal received by at least one receiving probe.

2. An anemometer according to claim 1, further comprising an impedance adaptation circuit operatively connected to each probe for widening the band-pass of the probe.

3. An anemometer according to claim 1, wherein the emitting probes and the receiving probes define a number of different ultrasonic signal propagation paths greater than the minimum number needed to provide enough propagation time values to afford calculation of the direction and the speed of the wind.

4. An anemometer according to claim 1, wherein the emitting probes and the receiving probes are multidirectional and form a group wherein each emitting probe emits an ultrasonic signal which can be received by a plurality of receiving probes.

5. An anemometer according to claim 1, wherein the emitting probes and the receiving probes are situated in such a way as to form a tetrahedron, at the apices of which said probes are located, said probes being orientated toward the center of the tetrahedron.

6. An anemometer according to claim 1, further comprising means for correlating the emitted signals and the received signals in digital form encoded on a single bit.

* * * * *